United States Patent [19]

James

[11] 3,840,209
[45] Oct. 8, 1974

[54] FLOW CONTROLLING DEVICES

[75] Inventor: George Stephen James, Johannesburg, South Africa

[73] Assignee: Anglo American Corporation of South Africa Limited, Johannesburg, South Africa

[22] Filed: July 24, 1972

[21] Appl. No.: 274,244

[30] Foreign Application Priority Data
July 29, 1971 South Africa.................. 71/5071
Apr. 24, 1972 South Africa.................. 72/2734

[52] U.S. Cl..................... 251/216, 251/145, 138/43
[51] Int. Cl............................................ F16k 31/58
[58] Field of Search .......... 251/118, 120, 121, 122, 251/126, 127, 147, 205, 208, 209, 213, 215, 216, 145, 146; 138/42, 43; 239/542

[56] References Cited
UNITED STATES PATENTS
2,323,115   6/1943   Bryant .............................. 138/43
2,443,036   6/1948   Hopkins ....................... 137/553 X
2,568,123   9/1951   Goldberg ............................ 138/43
2,598,961   6/1952   Andrus ........................... 138/43 X
2,752,201   6/1956   Blass ............................... 138/43 X
3,179,124   4/1965   Haring ........................... 137/525 X
3,753,527   8/1973   Galbraith et al. ............. 239/542 X FOREIGN PATENTS OR APPLICATIONS
617,438   3/1961   Canada ............................. 251/216

Primary Examiner—William R. Cline
Assistant Examiner—David R. Matthews
Attorney, Agent, or Firm—Young & Thompson

[57] ABSTRACT

A rate-of-flow control device for fluids consists of a tubular body of elastically deformable material and a screw having a sharp-peaked thread screw into the tube to a variable extent for the sharp peak to indent the inner wall of the tube and thus to provide a continuous, enclosed spiral duct through which the fluid flows. The body may be the plug of a rotary plug valve.

The device may be adapted to the carburation of fuel to an I.C. engine.

3 Claims, 5 Drawing Figures

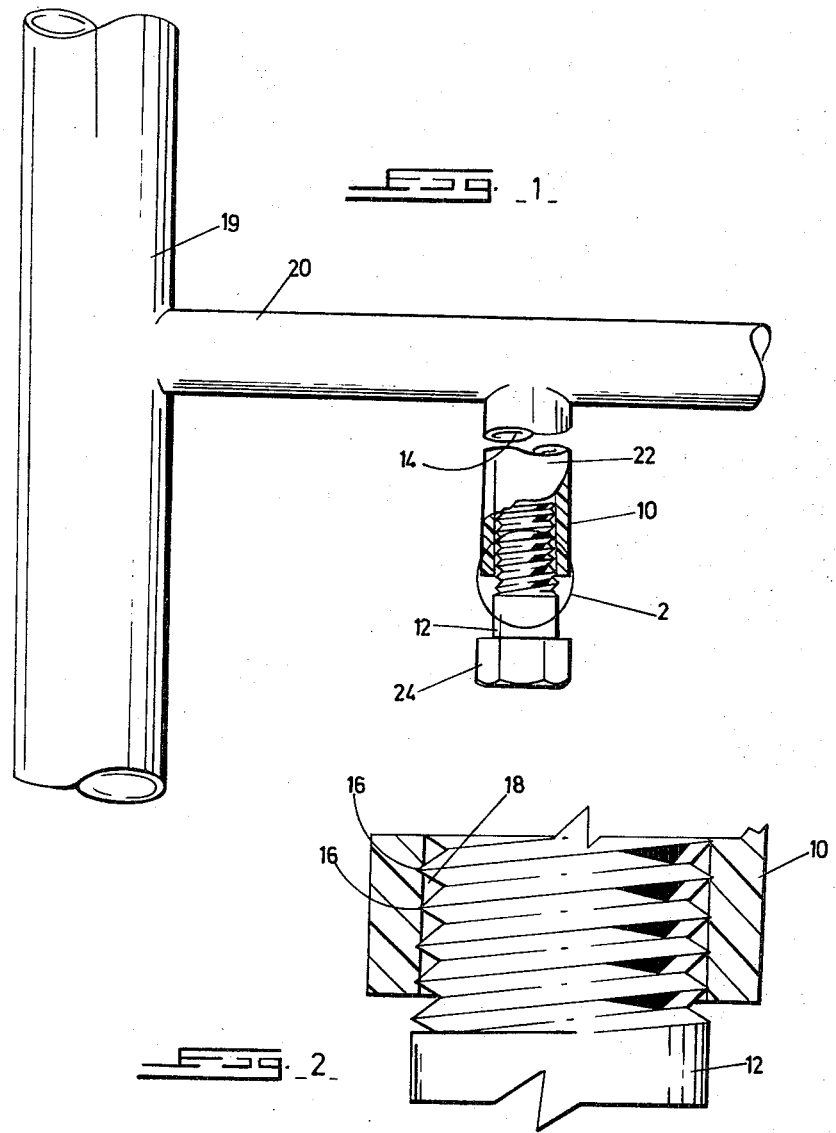

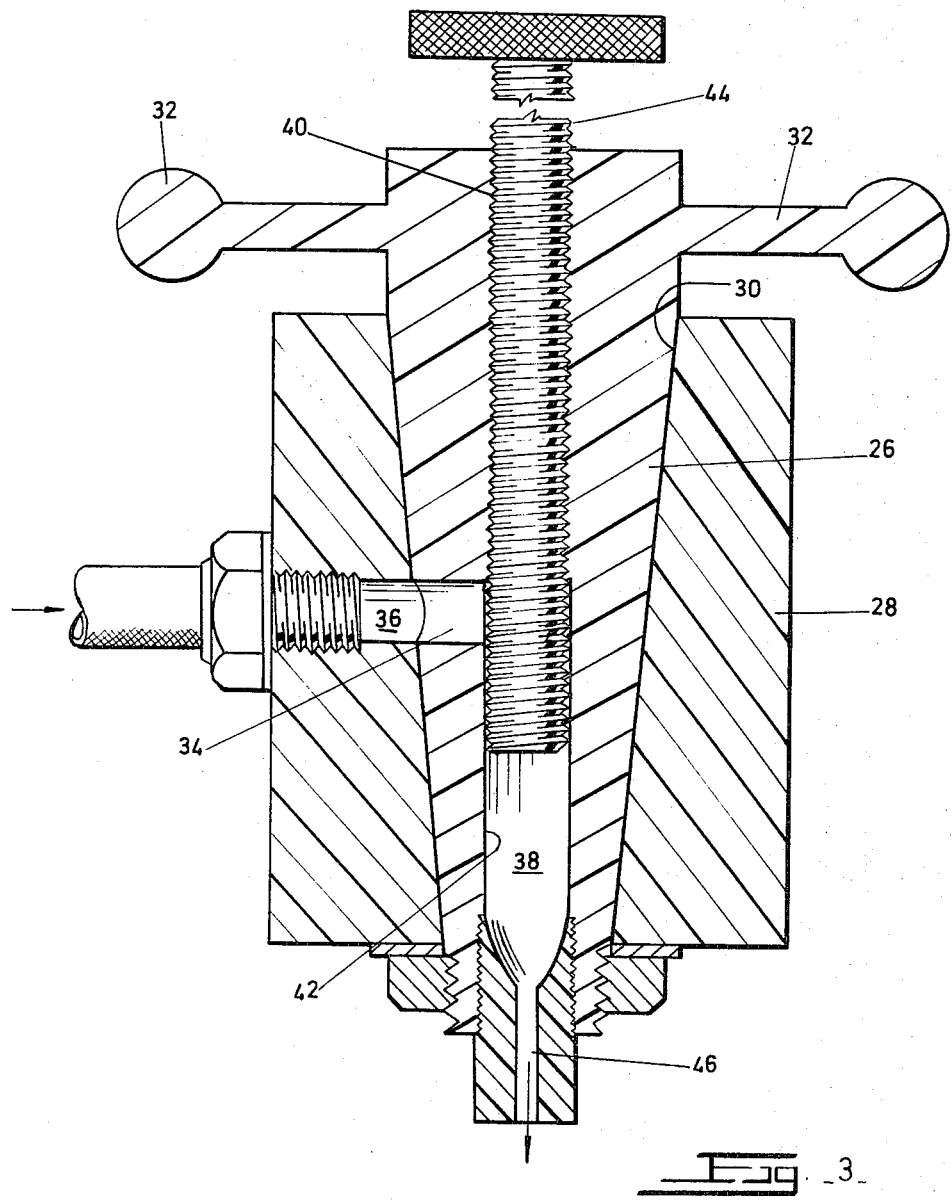

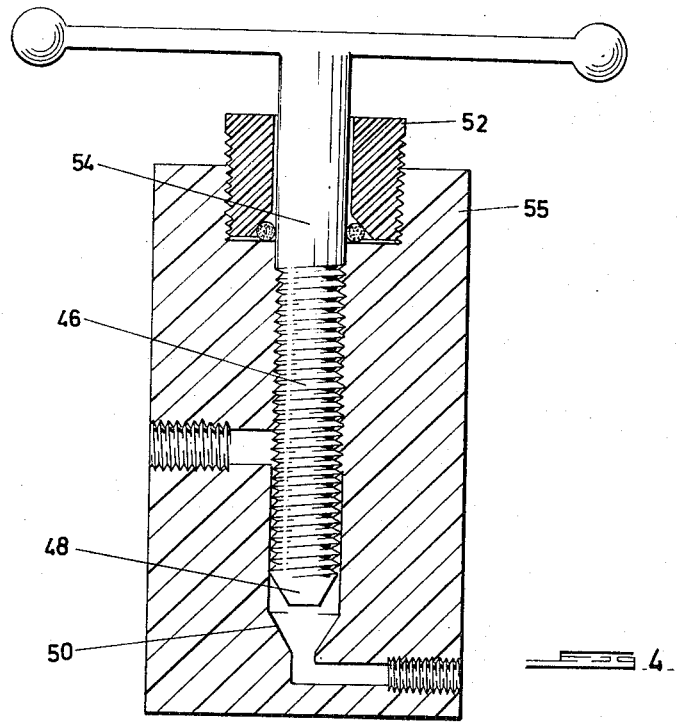
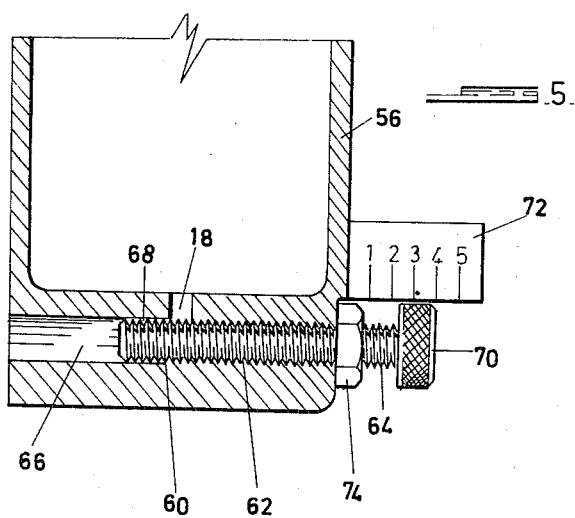

FLOW CONTROLLING DEVICES

This invention relates to the control of the flow of fluids, which term is intended to include both liquids and gases. The invention has particular reference to the control of slow rates of flow, for instance, in dosing devices, or in fields, such as drip irrigation.

The object of the invention is to provide a device which is capable of controlling flow with accuracy and constancy, which permits an infinitely variable adjustment of the rate of flow within the capacity of the device, which is both simple and inexpensive, and which can readily be serviced and maintained.

According to the invention, the device consists of a body, a cavity in the body, means to connect the cavity to a source of the fluid the flow of which is to be controlled, a discharge orifice in the body, a spiral duct between the cavity and the orifice defined between an internal and an external wall, one of which is formed with a sharp-peaked screw-threaded and the other of which is a plain wall of deformable material which the peak of the screw-thread indents; and means to vary the effective length of the duct. Preferably, the inner wall is provided by a screw and the external wall by a tube into which the screw is screwed; the internal diameter of the tube being smaller than the external diameter of the screw but larger than the root diameter of the screw.

Several embodiments of the invention are illustrated in the accompanying drawings in which:

FIG. 1 is a simple form of the invention, partly in section,

FIG. 2 is an enlarged fragmentary view of the part of FIG. 1,

FIG. 3 is a side view, partly in section, of another embodiment,

FIG. 4 is a longitudinal section through a third embodiment, and

FIG. 5 is a longitudinal section a fourth embodiment.

In the drawings, FIGS. 1 and 2, the invention is seen in its simplest form. This consists of a body in the form of a tube 10, of resiliently deformable material such as polyethylene, into which is screwed a screw 12 which extends part of the way into the tube, to provide a cavity 14 beyond the screw end, which is in communication with a source of the fluid of which the out-flow is to be controlled.

The particular feature of the screw is that the peak 16 of the screw-thread is sufficiently sharp, when the screw is screwed into the tube, to press or indent or even cut a complemental thread into the inner wall of the tube, as is seen in FIG. 2. The internal diameter of the tube is, obviously, smaller than the outer diameter of the screw, to ensure that the peak of the thread indents the inner wall of the tube; but the internal diameter of the tube is greater than the root diameter of the screw. Thus, there is formed between the screw and the inner wall of the tube, a spiral duct 18 that is continuous and fully enclosed along its entire length. There is, therefore, an extended path along which the fluid flows and the total enclosure of the path ensures that there is no short-circuiting of the flow across the peak of the thread; the fluid is compelled to flow along the duct from end to end.

The rate of flow along the duct is dictated by three factors: the fluid pressure at the entrance to the duct, the cross-sectional area of the duct, and the length of the duct. As to the fluid pressure, this is controllable within narrow limits and the fluctuations in the pressure of the fluid within the cavity 14 are not normally such that the rate of flow will be significantly affected. The cross-sectional area of the duct is a constant for a given combination of tube and screw, and can at will be changed by changing the screw for another of different thread contour or one that has a greater or lesser indentation into the wall of the tube, to vary the radial dimension of the duct. It is the length of the duct that is readily and quickly alterable, and this is effected merely by screwing the screw further into or out of the tube: the longer the duct the slower the rate of flow, the shorter the faster.

The simple form of the device of the invention can, for instance, be usefully applied in the field of drip irrigation. This is extensively used, especially in arid countries where water is precious. Various devices have been developed for the purpose. Among them is one in which water is fed from a header pipe into a number of branch pipes which are apertured at intervals. Interchangeable nozzles are inserted into each aperture, to cater for the varying needs of the system. As the rate of delivery of each nozzle is small — it may be as low as 3 litres per hour — the nozzles are necessarily minute in area and are therefore very easily blocked by entrained particles, especially where the irrigant carries nutrient which may be imperfectly dissolved. Also fine orifices may become either enlarged in use through wear or diminished by corrosion, so that uniformity of output is difficult and probably impossible to achieve. Another factor which must be borne in mind is that the discharge through the nozzles will be affected by the slope of the ground, so that the nozzle size employed must be selected in accordance with such slope; and as it is evident that, in practice, only a limited range of nozzles will be available, the selection must usually be a compromise. And, finally the efficiency of the system must depend upon the pressure of the supply. This may well vary, and, if it does, it is tiresome and time-wasting to have to change the nozzles of a series in order to cater for pressure changes.

In order to obviate these difficulties, another system uses the principle that the rate of flow of a liquid is restricted if it is caused to flow through an elongated orifice or tube, and the extent of the restriction can be governed by the diameter and the length of the tube. Thus, if each station in the branch pipes if fitted with a small-bore pipe, the pipelet can be cut off to a length which will restrict the flow to the required extent. At least, this is the theoretical basis, but in practice the efficiency of the system is affected by the unfortunate fact that, while it is possible to lessen the length, it is not possible to extend it. And, of course, the problem of blockage is materially unaltered. It cannot be said, therefore, that this system is much of an advance on the first system mentioned.

The defects of these systems are avoided by the device of the invention. In FIG. 1, water from a header pipe 19 enters a series of branch pipes of which only one 20 is shown. The branch pipe terminates in the device of the invention shown at 22. The screw 12 is provided with a head 24, by which it can be driven further into or withdrawn from the tube 10 by use of a spanner or by hand.

The thread pitch and depth, and the length of the screw are parameters which will be determined in relation to the result which it is desired to achieve, just as they would be in respect of any other application of the device of the invention. As an example, for use in a drip irrigation system operating at a pressure of one bar, it has been found that, with a 6 mm screw about 30 mm in length, screwed into a tube having an internal diameter of 5.5 mm, the outflow can be varied from about 3 litres/hour at a penetration into the tube of 18 mm, to 6.5 litres/hour at a penetration of 6 mm.

As the rate of flow corresponding to depth of penetration can be easily determined, accurate adjustments can be made to suit particular requirements. Indeed, the user can be supplied with a simple stepped or tapered gauge to insert between the head of the screw and the end of the pipe, in order to set the screws for predetermined flow rates. Once set, and given a fairly uniform pressure of supply, exact rates of flow can confidently be expected, with little maintenance or supervision. Should conditions change, adjustments can easily and quickly be made, and should a screw become clogged, it is easily removed, cleaned and replaced. And, should the output of the system have to be changed beyond the capacity of particular screws, it is a simple matter to withdraw the screws and replace them with others of different thread contour or length.

The embodiment of FIG. 3 is especially applicable to the dispensing of chemical solutions, and of gases. Here, the body consists of a plug 26 of frusto-conical shape which is rotatable within a housing 28 having a complementally shaped hole 30 in it to accommodate the plug. The plug has radially extending arms 32 to enable it to be rotated from a position in which a cross-bore 34 in the plug is in register with a bore 36 in the housing, and a position in which the cross-bore and the hole are out of register.

The plug has an axial bore 38 the upper part 40 of which beyond the cross-bore 34 is screw-threaded and the lower part 42 of which below the cross-bore, is plain.

Screwed into the axial bore 38 is a screw 44, the threading of which is engaged in the screw-threading of the axial bore. The engagement is a tight one, in order to exclude flow of fluid upwardly between the plug and the screw.

Below the cross-bore the plain portion of the axial bore is of smaller diameter than the external diameter of the screw but of larger diameter than the root diameter of the screw, so that, as in the embodiment of FIGS. 1 and 2, the threading indents the wall of the axial bore to provide a small-bore spiral duct for liquid to progress from the cross-bore 34 to the open end 46 of the axial bore. By screwing the screw further into or out of the axial bore, the length of the duct is varied and the rate of flow along the duct correspondingly varied.

Use of the arms 32 to rotate the plug within the housing, to carry the cross-bore in the plug out of register with the hole in the housing, cuts off flow of fluid to the cross bore, so that the device is both an "on-off" valve and a dispenser or rate-of-flow controller, wherein a preset rate of flow is attained immediately the plug from "off" to "on" position, without any adjustment.

As to materials, the plug is desirably made of a deformable material such as polyethylene, while the housing and the screw may be made of a hard material, for instance, brass or nylon.

The embodiment shown in FIG. 4 is a simplified version of the embodiment of FIG. 3. Here, the housing of FIG. 3 is omitted. Instead, the shut-off of the flow is effected by screwing down the spindle 46, the end 48 of which is needle shaped, on to a seat 50. To ensure that there is no leakage of fluid upwardly along the spindle, especially when the flow is shut off, a gland 52 is provided between the shank 54 of the spindle and the body 55. Of course, this embodiment lacks the virtue of the embodiment of FIG. 3, that the flow can be shut off without disturbing the setting of the device and thus the rate of flow through it.

In the embodiment of FIG. 5, the device of the invention is applied to the carburettion of fuel in an internal combustion engine. The main jets of the normal carburettor are a compromise, especially when mounted on a vehicle, because no vehicle operates only at the altitude for which the jet is ideally suited. For most of the time the mixture is either too rich or too weak, which is not only inefficient but aggravates pollution problems. The device shown in FIG. 5 allows nice adjustment of the fluid flow to be achieved with little trouble.

In the figure, 56 represents a float chamber, which has a port 58 through which fuel flows gravitationally. The lower wall of the chamber is thick enough to provide space for a passage 60 into which the port opens. The passage is screw-threaded at 62, to one side of the port, and plain to the other. A screw 64 is screwed into the screw-threaded part 62, to enter to a variable extent into the plain part 66 of the passage, and, as in other embodiments, to indent the plain wall to form a spiral duct 68. The head 70 of the screw is accessible to permit adjustment of the penetration of the screw into the passage, and the extent of penetration can be gauged on an index 72, which allows precise predetermination of the rate of flow of fuel from the float chamber into the passage. A lock nut 74 may be provided to lock the screw in adjusted position, but the fit of the screw within the screw-threaded part 62 of the passage is tight, as it must be to inhibit flow towards the screw head, so this locknut would usually not be needed to hold the screw in adjusted position.

The material of which the float chamber is composed is preferably elastically deformable, for instance polyethylene, to enable a close fit to be achieved between the screw and the part 62 of the passage but it may be of a plastically deformable material, such as a soft metal, so that the screw taps its own thread, at least as far as the plain part 66 of the passage is concerned. This comment is applicable to all embodiments, in which either elastically or plastically deformable material can provide the plain wall.

It is to be noted that, while the cross-sectional area of the duct can be changed to lessen the rate of flow, by for instance changing one screw for another of different thread contour, it is desirable that the duct area be fairly large so that the possibility of blockage is minimised, and that the rate of flow be controlled only by screwing the screw further into or out of the body, to vary its effective length.

It is not necessary for the inner wall of the duct to be provided by a screw, although this is in most instances the convenient way. Instead, the screw-threading may be provided in the outer wall and the inner wall be the plain wall which is indented by the thread.

I claim:

1. A device for controlling the rate of flow of fluid, comprising a body of deformable plastic material having a plain-walled cylindrical cavity therein, a metal screw having a sharp-peaked screw thread thereon threaded into said cylindrical cavity, the internal diameter of the cavity being smaller than the external diameter of the screw thread but being substantially larger than the root diameter of the screw thread thereby to define between said screw and said body a spiral duct for fluid, said body having a discharge orifice, and means to vary the length of said duct.

2. A device as claimed in claim 1, the screw thread extending out of said cavity whereby rotation of the screw varies the length of the duct.

3. A device as claimed in claim 1, there being a passage in the body intermediate the ends of the screw thread, said duct extending on only one side of said passage, the screw thread on the other side of the passage mating with the body to prevent flow of fluid on the other side of the passage.

* * * * *